(12) United States Patent
Burnham et al.

(10) Patent No.: US 9,194,286 B2
(45) Date of Patent: Nov. 24, 2015

(54) CONTROL SYSTEM FOR A TRANSPORT REFRIGERATION SYSTEM

(71) Applicant: THERMO KING CORPORATION, Minneapolis, MN (US)

(72) Inventors: Randall Scott Burnham, Maple Grove, MN (US); David Jon Renken, Prior Lake, MN (US); Erich Albert Lucht, Arden Hills, MN (US)

(73) Assignee: THERMO KING CORPORATION, Minneapolis, MN (US)

( * ) Notice: Subject to any disclaimer, the term of this patent is extended or adjusted under 35 U.S.C. 154(b) by 327 days.

(21) Appl. No.: 13/804,040

(22) Filed: Mar. 14, 2013

(65) Prior Publication Data

US 2013/0283826 A1     Oct. 31, 2013

Related U.S. Application Data

(60) Provisional application No. 61/614,958, filed on Mar. 23, 2012.

(51) Int. Cl.
*F02B 63/04* (2006.01)
*B60H 1/00* (2006.01)
*B60H 1/32* (2006.01)
(Continued)

(52) U.S. Cl.
CPC .......... *F02B 63/047* (2013.01); *B60H 1/00014* (2013.01); *B60H 1/00364* (2013.01); *B60H 1/3232* (2013.01); *B60K 1/00* (2013.01); *B60K 11/00* (2013.01); *B60K 11/02* (2013.01); *B60R 16/02* (2013.01); *F02B 63/04* (2013.01);
(Continued)

(58) Field of Classification Search
CPC ...... F02B 63/04; F02B 63/042; F02B 63/047; F02B 63/048; B60H 1/00014; B60H 1/00364; B60H 1/3232
USPC ............ 123/330–335, 350–349; 701/36, 110; 62/134, 129, 131, 132, 126; 332/14, 332/15, 29; 290/40 C, 40 A
See application file for complete search history.

(56) References Cited

U.S. PATENT DOCUMENTS 4,462,561 A    7/1984    Cronin
4,715,192 A   12/1987    Katz
(Continued)

FOREIGN PATENT DOCUMENTS

EP       1790921 A1 * 5/2007 .............. F25B 27/00
KR    1020090121463    11/2009

OTHER PUBLICATIONS

International Search Report for PCT/US2013/033512 mailed Jul. 18, 2013. 3 pages.
(Continued)

*Primary Examiner* — Mahmoud Gimie
(74) *Attorney, Agent, or Firm* — Hamre, Schumann, Mueller & Larson, P.C.

(57) ABSTRACT

A transport refrigeration system includes an engine, a generator set, and a refrigeration system. An electronic control unit and/or a reefer controller are configured to obtain an engine operation condition value and a transport refrigeration system operation value respectively. A genset controller is configured to determine a fuel efficient engine operation speed that is associated with the engine and/or transport refrigeration system operation condition value. The genset controller instructs the electronic control unit to operate the engine at the fuel efficient operation speed.

10 Claims, 6 Drawing Sheets

(51) Int. Cl.
  *B60K 1/00* (2006.01)
  *B60K 11/00* (2006.01)
  *B60K 11/02* (2006.01)
  *B60R 16/02* (2006.01)
  *F25B 49/02* (2006.01)
  *F25B 49/00* (2006.01)

(52) U.S. Cl.
  CPC ............... *F02B63/042* (2013.01); *F25B 49/00* (2013.01); *F25B 49/02* (2013.01); *F02B 63/048* (2013.01)

(56) References Cited

U.S. PATENT DOCUMENTS

| | | |
|---|---|---|
| 4,831,830 A | 5/1989 | Swenson |
| 4,903,495 A | 2/1990 | Howland et al. |
| 4,926,108 A * | 5/1990 | Schooley et al. ............... 322/15 |
| 5,390,068 A | 2/1995 | Schultz et al. |
| 5,557,938 A | 9/1996 | Hanson et al. |
| 6,018,200 A * | 1/2000 | Anderson et al. ........... 290/40 B |
| 6,044,651 A | 4/2000 | Reason et al. |
| 6,118,186 A | 9/2000 | Scott et al. |
| 6,148,627 A | 11/2000 | Reason et al. |
| 6,226,998 B1 * | 5/2001 | Reason et al. .................. 62/230 |
| 6,530,426 B1 | 3/2003 | Kishita et al. |
| 7,743,616 B2 | 6/2010 | Renken et al. |
| 2009/0228149 A1 | 9/2009 | Alston |
| 2010/0305794 A1 | 12/2010 | Foster |
| 2011/0187123 A1 | 8/2011 | Hamm et al. |

OTHER PUBLICATIONS

Written Opinion for PCT/US2013/033512 mailed Jul. 18, 2013, 5 pages.

* cited by examiner

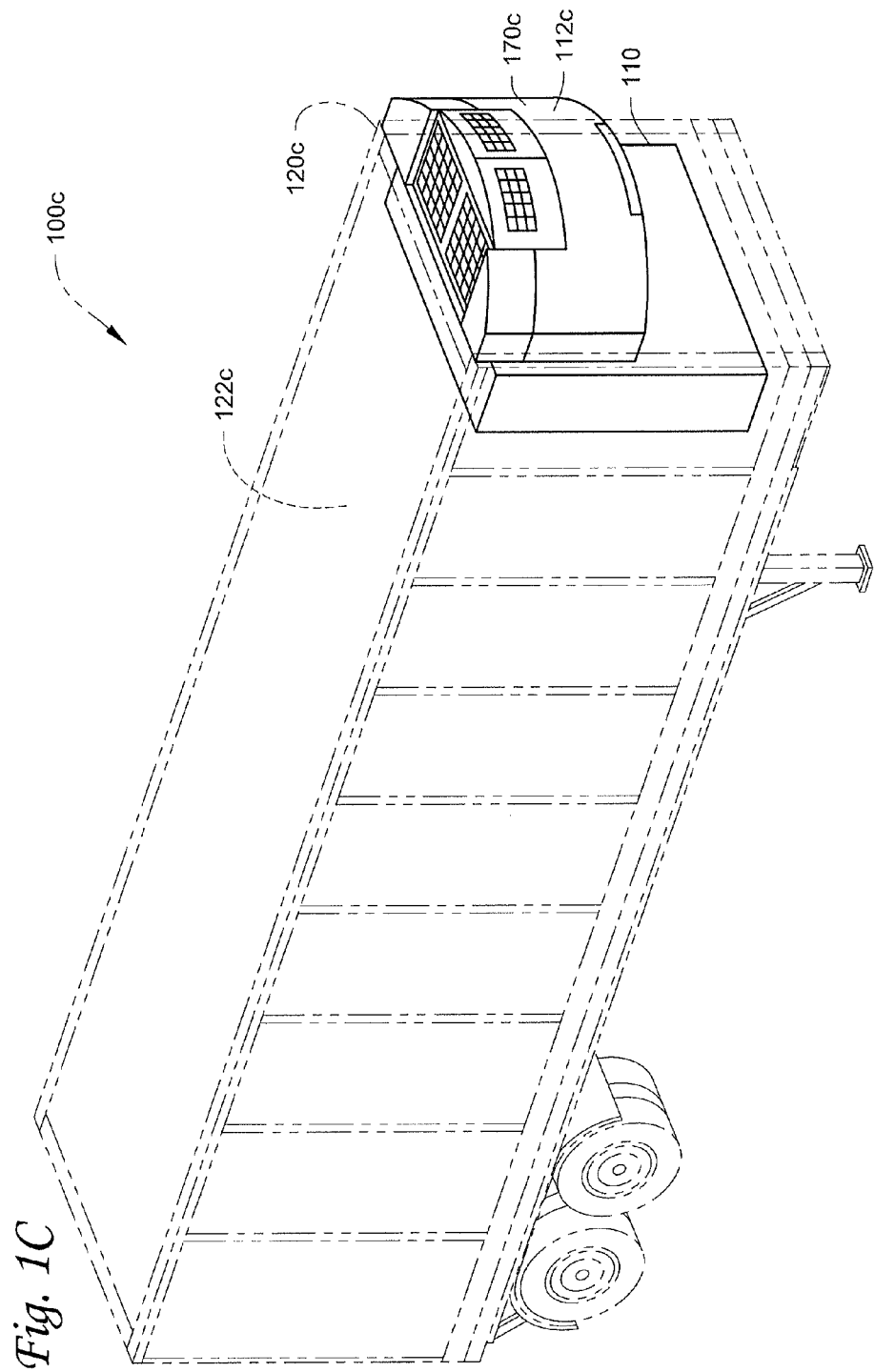

US 9,194,286 B2

CONTROL SYSTEM FOR A TRANSPORT REFRIGERATION SYSTEM

PRIORITY

This application claims the benefit of U.S. Provisional Application No. 61/614,958, entitled "CONTROL SYSTEM FOR A TRANSPORT REFRIGERATION SYSTEM", filed Mar. 23, 2012, which is incorporated herein by reference in its entirety.

FIELD OF TECHNOLOGY

The embodiments disclosed herein generally relate to a generator set for a transport refrigeration system. More specifically, the embodiments disclosed here relates to a control system for a multi-speed or variable speed generator set that may be configured to change an operation speed of the generator set based on parameters obtained by an electronic control unit and/or a refrigerator system monitor, such as a reefer controller.

BACKGROUND

Existing transport refrigeration systems are used to cool containers, trailers, and other similar transport units. Modern containers may be efficiently stacked for shipment by ship or rail. When containers are shipped by a truck, a single container is placed on a container chassis. When cargo in the container includes, for example, perishable products (e.g. food product, flowers, etc.), the temperature of the container may be controlled to limit loss of the cargo during shipment.

Some existing transport units may include a generator set that supplies power to temperature-controlling components of the transport refrigeration system. These generator sets are typically attached directly to the container or container chassis, and include an engine to power a generator, as well as a fuel container to supply fuel to the generator sets.

Generator sets may operate at a single, relatively constant speed to produce a relatively constant output frequency (e.g. 60 Hz) and one or more output voltages (e.g., ~230/460 VAC, etc.). These generator sets may operate at the same single speed regardless of the load on the transport refrigeration system. Therefore, the transport refrigerant system may not operate at the most fuel efficient condition for a particular load of the transport refrigeration system. During an extended period of time without inspection by, for example, transportation workers, these generator sets may use up the fuel in the fuel container. The out-of-fuel condition can cause loss of power to the transport refrigeration system, and may result in loss of the perishable cargo. This is especially true when ambient temperature conditions are relatively hot or relatively cold.

SUMMARY

Embodiments to increase fuel efficiency of a generator set for a transport refrigeration system are described. Embodiments to reduce the fuel consumption can help extend a period of time that the generator set can operate, and consequently can reduce the chance of occurrence of the out-of-fuel condition.

In some embodiments, a transport unit may include a transport refrigeration system and a generator set configured to provide power to the transport refrigerant system. In some embodiments, the generator set may include a prime mover, such as an engine, that can be operated at a variable speed.

The transport refrigeration system may also include an electronic control unit configured to obtain an engine operation condition value. In some embodiments, the transport refrigeration system may include a refrigeration system monitor, such as a reefer controller, configured to obtain a transport refrigeration system operation condition value.

In some embodiments, the generator set may include a genset controller. In some embodiments, a modeled engine response including an association between modeled optimal engine operation instructions and the engine and/or refrigeration system operation condition values may be saved in a memory unit of the genset controller. The genset controller may be configured to receive, for example, engine operation condition values and/or the transport refrigeration system operation condition values, and determine a modeled optimal engine operation instruction by fitting the engine and/or refrigeration system operation condition value to the association between the modeled optimal engine operation instructions and the engine and/or refrigeration system operation condition values. The genset controller may transmit the modeled optimal engine operation instructions to the electronic control unit so that the electronic control unit can operate the engine in a relatively efficient way.

In some embodiments, the engine operation condition value of the engine may be an amount of fuel delivered to the engine, air intake flow, or a shaft speed of the engine. In some embodiments, the transport refrigeration system operation condition value may be an amp draw by a compressor of the transport refrigeration system, a set point of the transport refrigeration system or a box temperature in a space of the transport unit.

BRIEF DESCRIPTION OF THE DRAWINGS

FIGS. 1A to 1C illustrate side perspective views of temperature controlled transport units. FIG. 1A illustrates a temperature controlled transport unit with a generator set mounted on a side of a chassis. FIG. 1B illustrates a temperature controlled transport unit with a generator set mounted to a bottom of a chassis. FIG. 1C illustrates a temperature controlled transport unit with a front mounted generator set.

DETAILED DESCRIPTION

Some transport units include a transport refrigeration system and a generator set configured to power the transport refrigerant system. The generator set may usually include a fuel container to provide fuel for a prime mover of the generator set. Methods and systems that help increase fuel efficiency of the prime move can reduce fuel consumption of the prime mover and therefore can help extend a period of time that the generator can be operated without refilling the fuel container and can help reduce environment impact such as noise, and help extend the service life of the generator set.

In the following description of the illustrated embodiments, embodiments to help increase the fuel efficiency are disclosed. Some embodiments described herein can be configured to monitor, for example, an operation condition of a prime mover of the generator set and/or a transport refrigeration system that is coupled to the generator set, and regulate the operation of the prime mover of the generator set according to the engine and/or transport refrigeration system operation condition. In some embodiments, a genset controller and/or an engine control unit can be configured to, for example, vary an operation speed of the prime mover based on the engine and/or transport refrigeration system operation condition, so that the engine speed can be kept at a relatively high fuel efficient or about the best fuel efficient range corresponding to the transport operation conditions. Operating the prime mover at about the best fuel efficient range can help reduce the fuel consumption and environment impact, as well as extend the service lives of the prime mover and the refrigeration system.

References are made to the accompanying drawings that form a part hereof, and in which is shown by way of illustration of the embodiments in which the embodiments may be practiced. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. The term "reefer" generally refers to, for example, a temperature controlled container chassis, container, or other types of transport unit, etc. The term "genset" generally refers to a generator set, which generally include a prime mover, such as an engine, and a generator. It is to be understood that the phraseology and terminology used herein is for the purpose of description and should not be regarded as limiting.

Figure 1A:
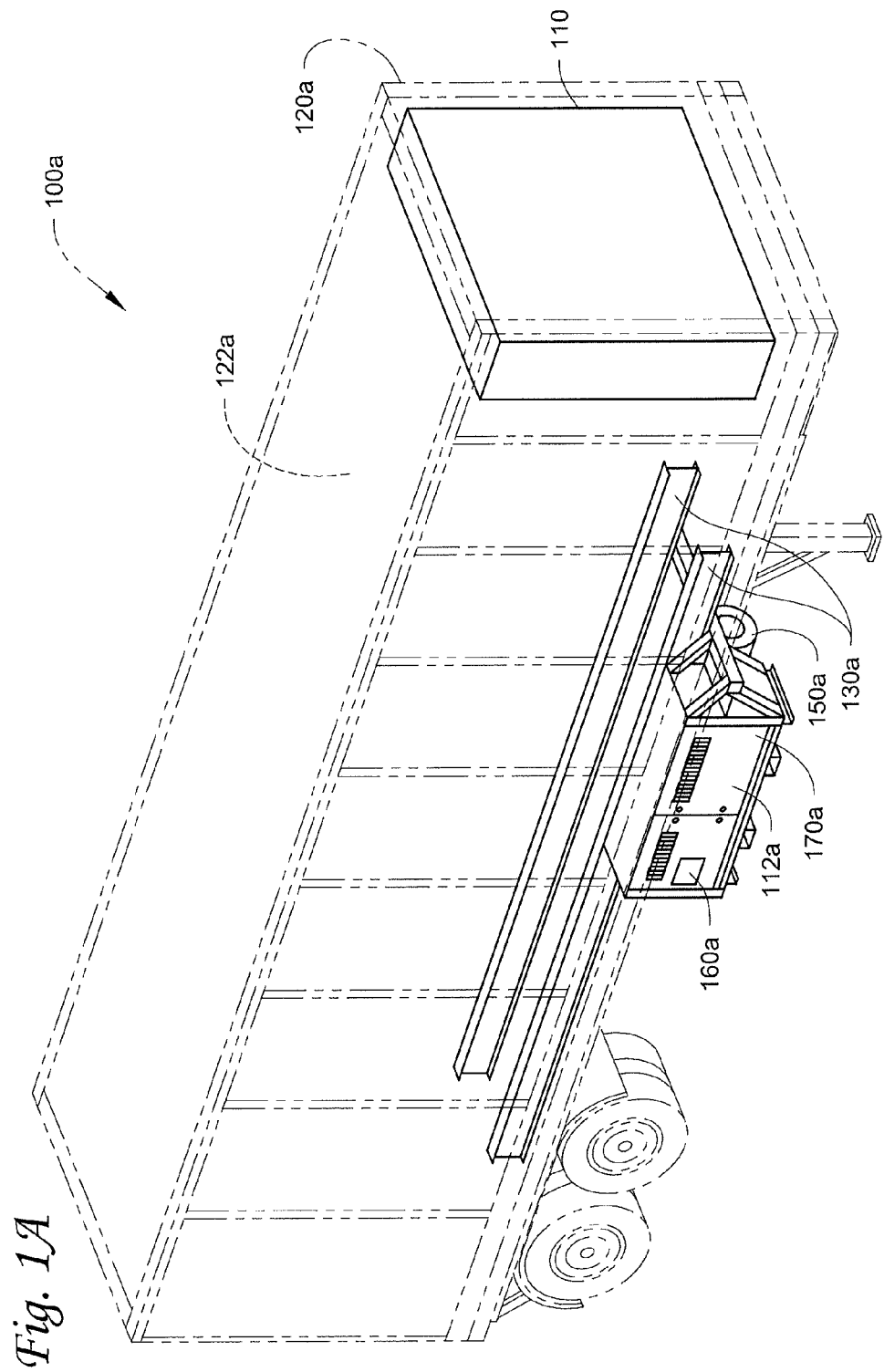
Figure 1B:
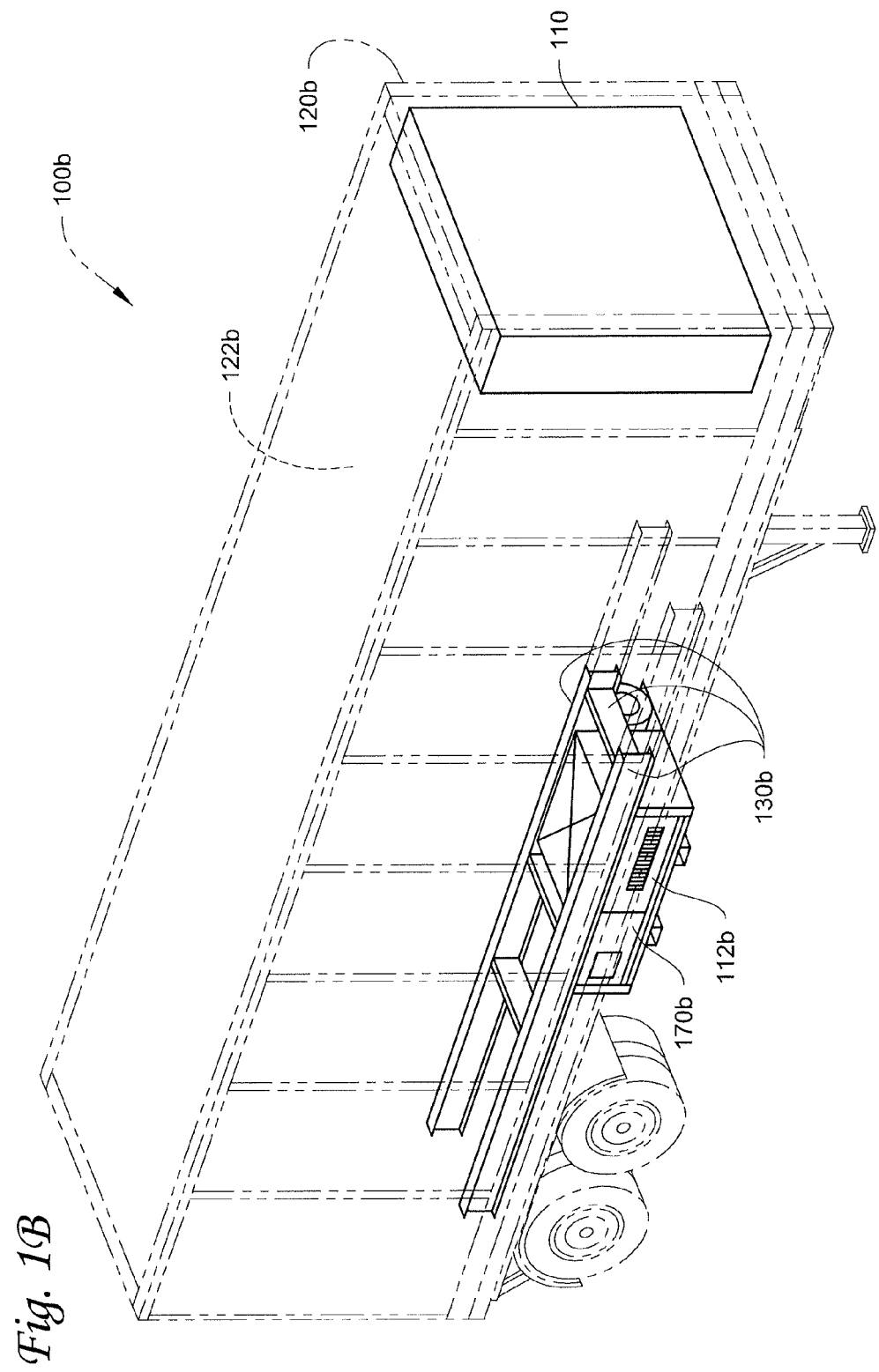

FIGS. 1A to 1C illustrate side perspective views of temperature controlled transport units 100a, 100b and 100c respectively with a transport refrigeration system 110. The transport refrigeration system 110 may be positioned at a front end 120a, 120b, 120c of the transport units 100a, 100b, and 100c respectively. The transport refrigerant system 110 may draw power from a generator set 112a, 112b and 112c respectively.

Figure 2:
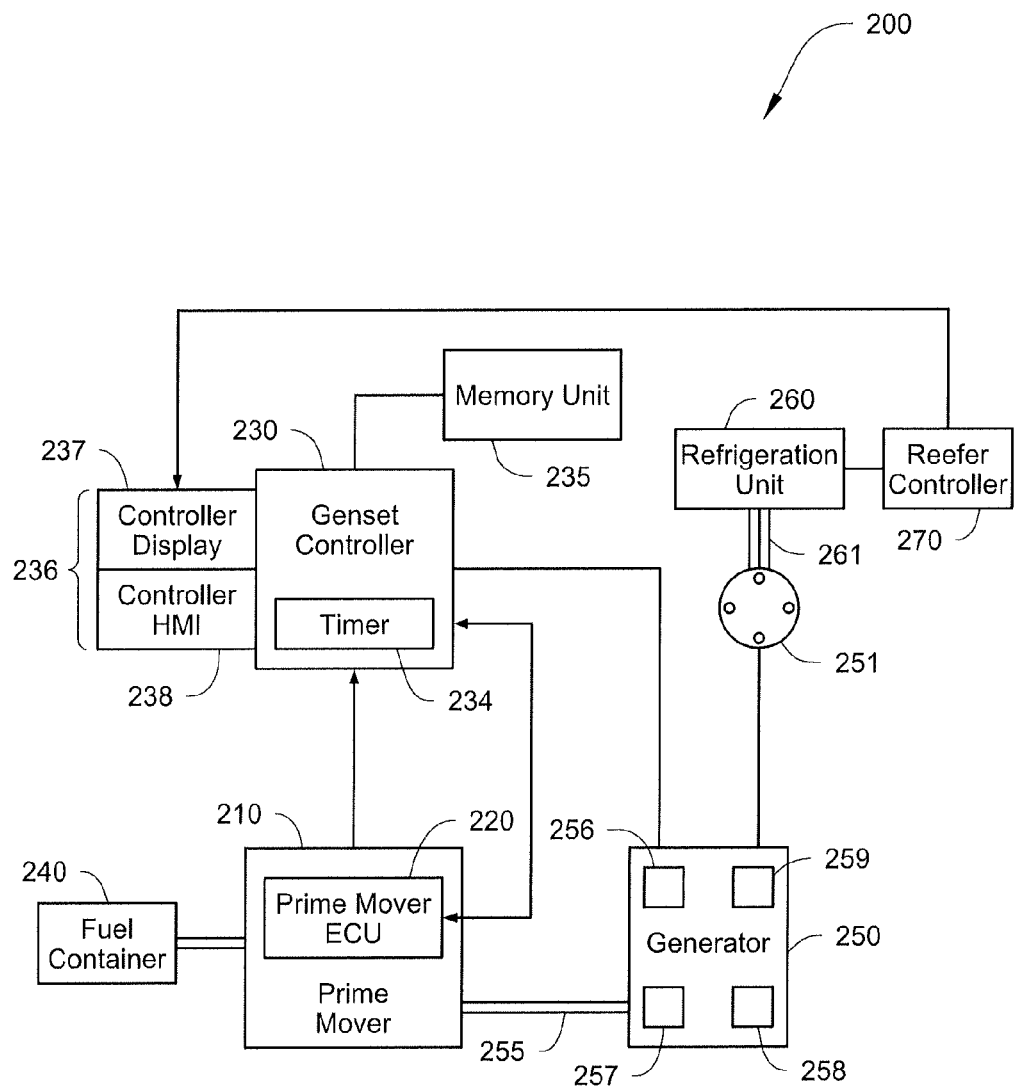
FIG. 2 is a schematic view of an embodiment of a transport unit that includes a transport refrigeration system and a generator set configured to power the transport refrigerant system.

Referring to FIG. 1A, the generator set 112a may include a housing 170a that houses a prime mover (not shown in FIG. 1A, see the prime mover 210 in FIG. 2) and a generator (not shown in FIG. 1A, see the prime mover 210 in FIG. 2). A fuel tank 150a is configured to supply fuel to the prime mover. The housing 170a includes a human machine interface (HMI) 160a, with which a user can input, for example, commends to a controller (not shown) of the generator set 112a.

As shown in FIG. 1A, the generator set 112a can be mounted to a chassis 130a of the transport unit 100a from a side of the chassis 130a.

As illustrated in FIG. 1B, a housing 170b of the generator set 112b can also be mounted to a chassis 130b of the transport unit 100b from a bottom of the chassis 130b.

As illustrated in FIG. 1C, a housing 170c of the generator set 112c can be mounted to the front end of the transport unit 110c. A fuel tank (not shown) configured to supply fuel to the generator set 112c may also be enclosed in the housing 170c.

The transport refrigeration system 110 can regulate various conditions (e.g., temperature, humidity, etc.) in a space 122a, 122b, and 122c of the transport unit 100a, 100b and 100c respectively. In some embodiments, the generator set 112a, 112b and 112c may be configured to be operable at a variable speed, for example, between 0 rpm and the maximum designed operation speed of a prime mover (such as the prime mover 210 in FIG. 2) of the generator set 112a, 112b and 112c.

It will be appreciated that the embodiments described herein may be used with trucks, trailers and container units. The embodiments described herein may be used in any other suitable temperature controlled apparatuses such as a ship board container, an air cargo cabin, an over the road truck cabin, etc. The refrigeration system may be a vapor-compressor type refrigeration system, or any other suitable refrigeration systems that can use refrigerant, cold plate technology, etc.

FIG. 2 illustrates a schematic view of a transport unit 200. The transport unit 200 has a generator set that generally includes a prime mover 210, a prime mover electronic control unit (ECU) 220, a genset controller 230, a fuel container 240, and a generator 250. The transport unit 200 also includes a transport refrigeration system 260 that is coupled to the generator 250.

The illustrated prime mover 210 may be an internal combustion engine (e.g., diesel engine, etc.) that may generally have a cooling system (e.g., water or liquid coolant system), an oil lubrication system, and an electrical system (none shown). An air filtration system (not shown) filters air directed into a combustion chamber (not shown) of the prime mover 210. The prime mover 210 may also be an engine that is configured specifically for a transport refrigeration system. The fuel container 240 is in fluid communication with the prime mover 210 to deliver a supply of fuel to the prime mover 210.

The prime mover 210 may be controlled by the ECU 220. The ECU 220 can be configured to regulate an amount of fuel delivered to the prime mover 210 and can be configured to operate the prime mover 210 at a variable speed that, for example, is between 0 and the maximum designed operation speed of the prime mover 210. It is to be appreciated that in some embodiments, the prime mover 210 can be operated at a plurality of discrete operation speeds, such as ~1800 rmp and ~1500 rpm in one embodiment. The ECU 220 can also be configured so that the operation speed of the prime mover 210 can be maintained relatively constantly until the ECU 220 receives an instruction (or command), for example from a genset controller 230, to operate the prime mover 210 at a variable speed.

The genset controller 230 is configured to be coupled with a reefer controller 270 and the ECU 220. The genset controller 230 is configured to receive information from the ECU 220 and/or the reefer controller 270, and instruct the ECU 220 to vary the operation speed of the prime mover 210 based on the information received from the ECU 220 and/or the reefer controller 270. More detail regarding the operation of the genset controller 230 is discussed below. It is to be appreciated that information can be transmitted between the genset controller 230, the reefer controller 270 and the ECU 220 through wire(s) or wirelessly.

A generator 250 can be coupled to the prime mover 210 by a flex disk 255 that transfers mechanical energy from the prime mover 210 to the generator 250. In some embodiments, the generator 250 can also be coupled to the prime mover 210 indirectly by a driving belt. The generator 250 includes a power receptacle 251 that is in electrical communication with the transport refrigeration system 260 via a power cable 261 to provide electrical power to the transport refrigeration system 260.

The generator 250 may be an alternating current ("AC"), 3-phase generator that generally includes a frequency inverter 256, a rotor 257, a stator 258, a voltage regulator or DC generator 259. The rotor 257 is coupled to the flex disk 255 such that the prime mover 210 is operable to rotatably drive the rotor 257 at a non-zero speed. The stator 258 is a stationary component of the generator 250 that includes magnetic pole pairs (e.g., two pole pairs).

The voltage regulator 259 includes a field voltage and a field current that are generated by a regulation element (not shown) that is coupled to the voltage regulator 259. In some embodiments, the regulation element may include batteries or other solid-state components that generate a direct current through the voltage regulator 259. The field voltage and the field current define a field excitation. The field excitation of the generator 250 is generally considered a field of the generator 250. The field can be one part of the rotor 257 and the stator 258.

Rotation of the rotor 257 through the magnetic field induces an output current from the generator 250. The induced output current produces an output voltage of the generator 250 that is directed through the power receptacle 251 to the transport refrigeration system 260. It is to be noted that other types of generators can be used in place of the generator 250. The generator 250 as described herein is exemplary only.

The generator 250 can include an output frequency inverter 256, which is configured to regulate a frequency of the output current at the receptacle 251. Generally, when the operation speed of the prime mover 210 varies, the frequency of the induced output current that is generated by the rotations of the stator 258 and/or the rotor 257 can vary accordingly. The output frequency inverter 256 can regulate the frequency of the induced output current generated by the stator 258 and the rotor 257 so that the frequency of the output current at the receptacle 251 is maintained at a relatively constant frequency. In some embodiments, the transport refrigeration system 260 may be configured to be operated, for example, at ~50 Hertz. Accordingly, the frequency inverter 256 can be configured to maintain the frequency of the output current at the receptacle 251 at ~50 Hertz.

It is appreciated that in some embodiments, a DC powered refrigeration system may be used. In such a situation, the frequency inverter 256 may not be necessary.

The generator 250 can be configured to provide a relatively constant load capacity that is sufficient to provide power to the transport refrigeration system 260 under various loads. A load on the generator 250 corresponds to the cooling demand or load on the transport refrigeration system 260 (e.g., electrical power needed by the transport refrigeration system 260), and may be variable in response to changes in the load on the transport refrigeration system 260.

When the prime mover 210 changes its operation speed, the output voltage generated by the rotation of the rotor 257 and/or the stator 258 can vary. Generally, the faster the operation speed of the prime mover 210 is, the higher the output voltage is. The voltage regulator or DC generator 259 can be configured to maintain the output voltage at the receptacle 251 at a relatively constant voltage even, for example, when the operation speed of the prime mover 210 varies.

The ECU 220 can be configured to monitor an engine operation condition and control the operation of the prime mover 210. The ECU 220 may have a microprocessor that can communicate with an array of sensors that are configured to monitor engine operation parameters, such as engine speed, oil temperatures, piston positions, etc. By analyzing the readings from the array of sensors, the ECU 220 can monitor/obtain the operation conditions of the prime mover 210. In some embodiments, the ECU can monitor/obtain the operation conditions of the prime mover 210 almost in real-time.

The ECU 220 can be configured to control the operation speed of the prime mover 210. The ECU 220 can be configured to control, for example, a fuel pump so that the amount of fuel delivered to combustion chambers of the prime mover 210 can be regulated by the ECU 220. By regulating the amount of fuel delivered, the ECU 220 can control the operation speed of the prime move 210 and maintain the operation speed of the prime mover 210 relatively constant unless the ECU 220 receives an instruction to do otherwise.

The reefer controller 270 is configured to monitor the operation condition of the transport refrigeration system 260. The reefer controller 270 may have a microprocessor that can communicate with an array of sensors that are configured to monitor, for example, a box temperature in the space 180 as shown in FIG. 1B; an amp draw by a compressor of the transport refrigeration system 260; a set point of the transport refrigeration system 260, etc. By analyzing the readings from the array of sensors, the reefer controller 270 can obtain the operation conditions of the transport refrigeration system 260. In some embodiments, the reefer controller 270 can be configured to obtain the operation conditions of the transport refrigeration system 260 almost in real time. The reefer controller 270 may also be configured to control the operation of the transport refrigeration system 260.

It is to be appreciated that in some embodiments, the genset controller 230 can be configured to communicate with the array of sensors directly to obtain the operation conditions of the prime mover 210 and/or the transport refrigerant system 260.

The ECU 220 can be configured to monitor the engine operation conditions and the reefer controller 270 can be configured to monitor the transport refrigeration system operation conditions. Both the ECU 220 and the reefer controller 270 can be configured to convert the engine or transport refrigeration system operation conditions monitored/obtained by the ECU 220 and the reefer controller 270 into engine and/or transport refrigeration system operation condition values respectively that can be transmitted back to and/or received by the genset controller 230 through the coupling (wired coupling or wirelessly coupling) between the genset controller 230 and the ECU 220 and/or the reefer controller 270.

The genset controller 230 has a microprocessor that is configured to make various operating instructions in response to the engine and/or transport refrigeration system operation condition values received from the ECU 220 and/or the reefer controller 270. The operating instructions generated by the genset controller 230 can then be transmitted to the ECU 220 via the coupling between the ECU 220 and the genset controller 230. After receiving the operating instructions transmitted from the genset controller 230, the ECU 220 may then operate the prime mover 210 in accordance with the operating instructions transmitted from the genset controller 230.

FIG. 2 further shows that the genset controller 230 can be configured to be in communication with a timer 234, a memory unit 235, and an operator interface 236.

In some embodiments, the memory unit 235 may be a Random Access Memory ("RAM") that can maintain a data log related to parameters of the prime mover 210 and the generator 250, as a well as other data. In some embodiment, the memory unit 235 may store engine operation instructions.

The operator interface 236 includes a genset controller display 237 and a genset controller human machine interface (HMI) 238 for viewing and entering commands into the genset controller 230. The timer 234 can be configured to separately measure a duration time that the prime mover 210 operates at a specific speed if desired.

In operation, the genset controller 230, the ECU 220 and/or the reefer controller 270 can work together to operate the prime mover 210. The genset controller 230 can be configured to receive engine and/or transport refrigeration system operation condition values. The memory unit of the genset controller 230 can be configured to store a modeled engine response, which may, for example, include an association between the engine and/or refrigeration operation condition values and the corresponding engine operation instructions. The microprocessor of the genset controller 230 can determine the engine operation instructions by fitting the engine and/or transport refrigeration system operation condition values on the modeled engine response. The microprocessor of the genset controller 230 can be also configured to determine the engine operation instructions based on the engine and/or transport refrigeration system operation condition values as well as the values of the internal timer 234 and/or user inputs. The genset controller 230 can then send the operation instructions to the ECU 220 so that the ECU 220 can operate to control the prime mover 210 in accordance with the instructions sent from the genset controller 230.

The transmission of the information between the ECU 220, the genset controller 230, the reefer controller 270, and/or other components can be performed through a wire(s) or wirelessly.

In the illustrated embodiment, the operation instructions are, for example, the operation speeds of the prime mover 210. Generally, the most efficient operation speed (i.e. the operation speed that consumes the least amount of fuel) varies according to different operation conditions of the prime mover 210 and/or the transport refrigeration system 260. For example, when the engine load is high such as more than ~80% of the maximum load of the prime mover 210, the prime mover 210 may be more fuel efficient at a high speed such as ~1800 resolutions per minute (RPMs). However, when the engine load is low such as less than ~20% of the maximum load of the prime mover 210, the prime mover 210 may be more fuel efficient at a low speed such as ~1500 RPMs. Similarly, when the refrigeration system requires a high power drawn, the prime mover 210 may be more efficient at a relative high RPM (e.g. ~1800 rpm); when the refrigeration system requires a low power drawn, the prime mover 210 may be more efficient at a relative low RPM (e.g. ~1500 rmp). The most efficient operation speed at each engine and/or transport refrigeration system operation condition may be determined, for example, by testing in a laboratory setting. In the illustrated embodiment, the operation speed of the prime mover 210 can be any speed between 0 and the maximum operation speed of the prime mover 210, with the appreciation that the prime mover 210 can be configured to be operated at a plurality of discrete speeds in some embodiments.

The instructions made by the genset controller 230 may be transmitted to the ECU 220 by different methods. For example, the microprocessor of the genset controller 230 may interpret the instructions by outputting different voltage signals. For example, if the genset controller 230 makes an instruction to stop the prime mover 210, the voltage signal can be configured to be 0 volt. If the genset controller 230 makes an instruction to operate the prime mover 210 at about the maximum designed operation speed, the voltage signal can be ~5 volts. If the genset controller 230 makes an instruction to operate the prime mover 210 at ~50% of the maximum designed operation speed, the voltage signal is ~2.5 volts. Accordingly, any specific operation speed can be associated with a unique voltage signal. In some embodiments, the signals generated by the genset controller 230 may be a pulse width modulated signal.

The ECU 220 can be configured to measure the voltage signals received from the genset controller 230. Because each voltage signal is associated with a specific operation speed, the ECU 220 is configured to adjust the prime mover 210 to operate at a speed that is associated with the specific voltage signal. The ECU 220 can be configured to monitor the voltage output of the genset controller 230 continuously or at a constant interval. The ECU 220 is configured to maintain the prime mover 210 at the speed until the ECU 220 receives another voltage signal from the genset controller 230 that is associated with a new operation speed of the prime mover 210. The ECU 220 may then be configured to adjust the prime mover 210 so that the prime mover 210 is switched to the new speed.

Figure 3:
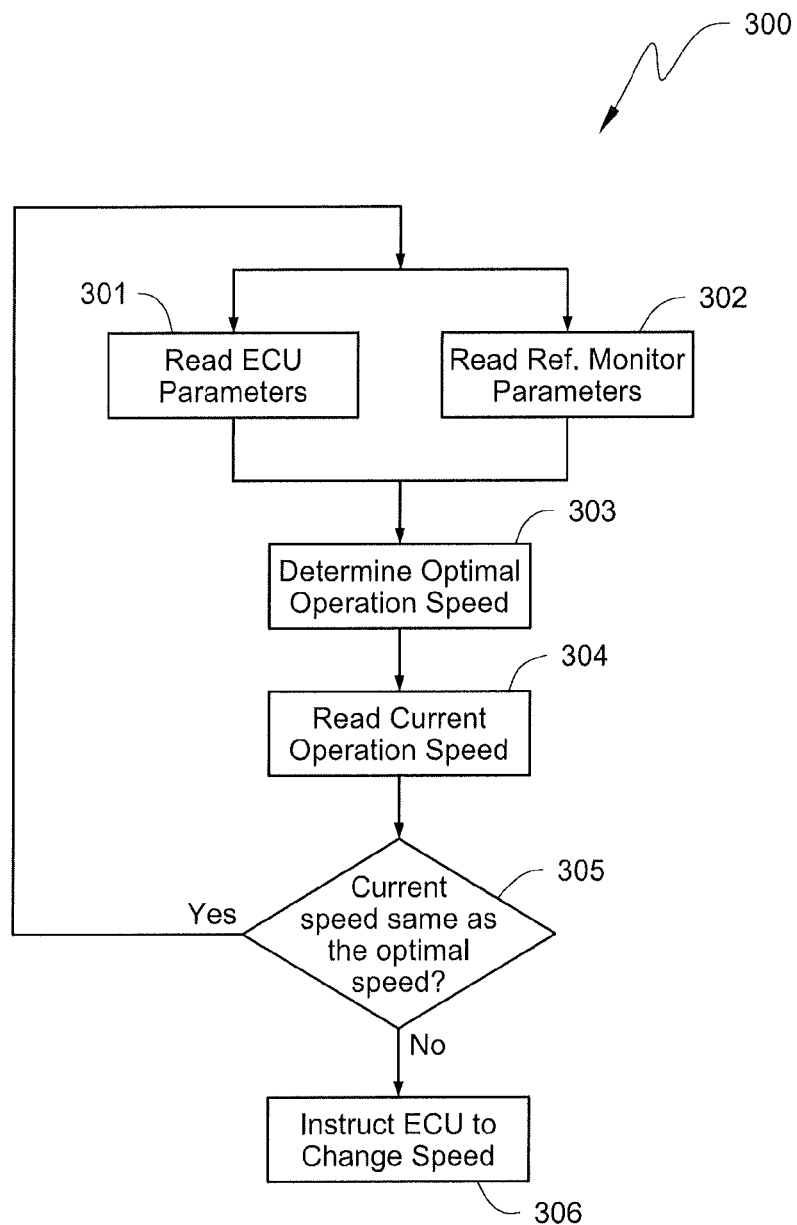
FIG. 3 is a flow chart of the operation of the genset controller of the transport refrigeration system as shown in FIG. 2.

FIG. 3 shows one embodiment of a process 300 by which the genset controller 230 as shown in FIG. 2 can be operated. The process 300 may be stored in the memory unit 235 as shown in FIG. 2.

At 301 and 302, the genset controller 230 reads the engine and/or transport refrigeration system operation condition values. The engine and/or transport system operation condition values may be provided by an ECU 220 or a reefer controller 270. The engine and/or transport system operation condition value may also be derived based on ECU parameters and/or reefer controller parameters. The ECU parameters may be obtained/derived by the ECU 220 via monitoring an array of sensors. The ECU parameters may include an amount of fuel delivered to the prime mover, air intake flow and/or a shaft speed. The ECU parameters can also include an engine load, engine torques, engine percent rated torque at a certain speed, and/or calculated torque minus peak torque at a certain speed, exhaust gas temperature, etc. The reefer controller 270 parameters can be an amp draw of an electrical current drawn by a compressor of the transport refrigeration system 260, a set point of the transport refrigeration system 260 or a box temperature in a space of the transport container unit. The reefer controller parameters may also include a status of a refrigeration control process. The refrigeration control process may be a process that is configured to control the cycles of the transport refrigeration system 260 so that the transport refrigeration system 260 can be operated at about the most efficient way to control the temperature in the space 180 as shown in FIG. 1B. As shown in FIG. 2, refrigeration control can be performed by the reefer controller 270.

After reading the ECU and/or reefer controller parameters, the genset controller 230 decides an operation instruction, such as a modeled operation speed based on the parameters at 303. As discussed above, the decision can be based on a modeled engine response stored in the memory unit 235. At 304, the genset controller 230 reads the operation speed of the prime mover 210, and compares the operation speed to the modeled operation speed at 305. If the speed is the same as the operation speed, the process goes back to 301 and 302. If the speed is different from the modeled operation speed, the genset controller 230 instructs the ECU 220 to change the speed of the prime mover 210 at 306.

The genset controller 230 may be configured to read the ECU parameters and/or the refrigeration system parameters continuously or in a constant interval. The genset controller 230 may be configured to change the operation speed when the operation condition values of the prime mover 210 and/or the transport refrigeration system 260 change. In this way, the prime mover 210 can be kept at the speed that is relatively fuel efficient or about the most fuel efficient corresponding to the prime mover 210 operation condition and/or the transport refrigeration system operation condition.

Figure 4:
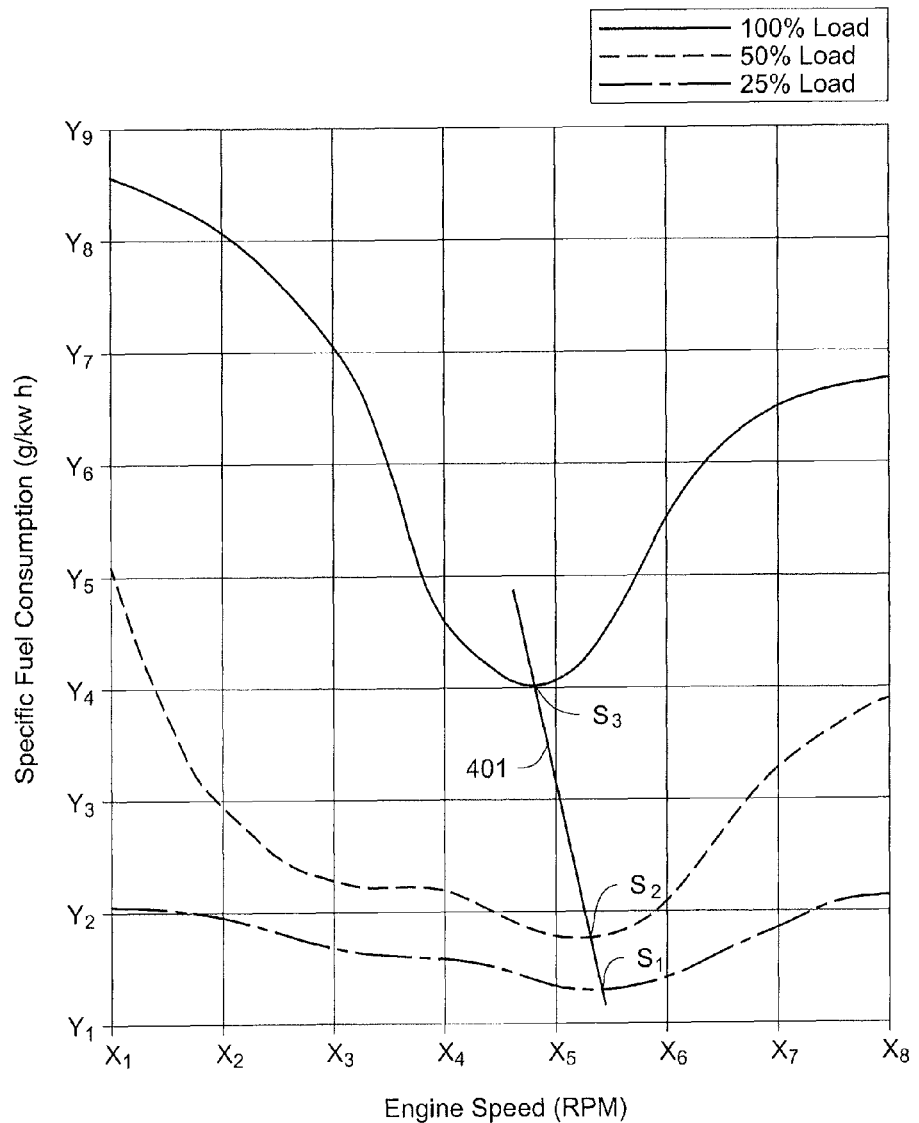
FIG. 4 is a representative graph showing an association between the brake specific fuel consumption and the engine speed of a prime mover of the generator set as shown in FIG. 2, when the engine loads of the prime movers vary.

FIG. 4 further illustrates a modeled engine response 401 that the genset controller 230 can use to determine a modeled optimal fuel efficient operation speed. The vertical axis is brake specific fuel consumption (BSFC) of an engine, such as the prime mover 210 in FIG. 2. Points y1-y9 correspond to nine different fuel consumption values (per gram per kilowatt per hour) that are arranged from the lowest value to the highest value respectively. The horizontal axis is the engine speeds in RPMs. Points x1-x8 correspond to eight different engine speeds that are arranged from the lowest values to the highest values respectively. In some embodiments, x1 is 1000 RPM and x8 is 2000 RPM.

Testing and measuring can be performed, for example in a laboratory setting, to obtain the BSFC values at different engine speeds under specific engine loads. As illustrated in FIG. 4, for example, three engine loads: ~25%, ~50% and ~100% engine loads are shown. When the engine load is ~25%, the measured most fuel efficient engine speed (i.e. the point that has the lowest BSFC value) is about s1, which is between the engine speeds x5 and x6. When the engine loads are ~50% and ~100%, the measured most fuel efficient engine speeds are about s2 and s3 respectively, which are between engine speeds x5 and x6 and between engine speeds x4 and x5 respectively. Likewise, the BSCF/engine speed graphs for other engine loads, such as 10%, 25%, 30%, can be established, and the measured most fuel efficient engine speed can be established for each engine load.

The modeled engine response 401 can be established by fitting a line or curve fit the dots representing the measured most fuel efficient engine speed under each engine load, such as the dots s1, s2 and s3. Each point on the modeled engine response 401 can represent a modeled optimal fuel efficient engine operation speed corresponding to a specific engine load. For example, if the load is ~25%, the modeled optimal engine operation speed is ~s1. If the load is a value between ~25% and ~50%, the modeled optimal fuel efficient engine operation speed is a value between x5 and x6 that can be determined by fitting the load value to the modeled engine response 401. The engine load of the prime mover 210 can be obtained by the ECU 220, or can be calculated in the genset controller 230 according to parameters, such as the amount of fuel delivered to the engine, which is by the ECU 220. The genset controller 230 then can receive the engine load value of the prime mover 210 and be configured to obtain a modeled optimal fuel efficient engine speed by fitting the engine load value of the prime mover 210 to the modeled engine response 401.

It is to be noted that the modeled engine response 401, as well as the correlation between the optimal fuel efficient engine speed and the engine load do not have to be exact. Some variations in the engine speed, for example 100 RPMs, may not likely affect the overall engine efficiency. Likewise, variations in the refrigeration systems due to tolerances in a manufacturing process may also not likely affect the overall engine efficiency.

It is to be appreciated that the modeled engine response 401 is exemplary. Other modeled engine responses based on other values may be established. In some embodiments, the modeled engine responses based on multiple parameters from the ECU 220 and/or the reefer controller 270 can be established. A general principle for establishing a modeled engine response of a variable speed engine is to establish an association between the fuel efficient operation speeds and one or multiple parameters obtained by the ECU 220 and/or the reefer controller 270. These parameters may usually be values that can vary depending on the engine operation status or operation condition, and can be by the ECU 220 and/or the reefer controller 270. The fuel efficient operation speeds can generally be obtained by measuring or testing.

Further, the refrigeration system may have a transport refrigeration system operation process that can be configured to operate the transport refrigeration system 260 efficiently. For example, the transport refrigeration system 260 may operate in a full load mode continuously if the box temperature is, for example, ~20 degree Celsius away from the set point, but operate in a less than full load mode if the temperature difference is, for example, ~3 degrees Celsius. The and future statuses of the operation process for the transport refrigeration system 260 may also be transmitted to the genset controller 230, and the genset controller 230 can be configured so that the genset controller 230 can send instructions to the ECU 220 to operate the prime mover 210 at the optimal engine speeds that can not only satisfy the transport refrigeration system operation requirements, but also predictively satisfy the future operation requirement of the transport refrigeration system.

In some other embodiments, the modeled engine response 401 may be configured to operate engine in other modes. For example, the modeled engine response 401 may be configured to operate the engine at a low noise level, operate the engine so that the box temperature can be pulled down quickly, operate the engine so that the engine remains warm, operate the engine so that a battery of the refrigeration system 200 can be charged quickly.

It is to be appreciated that the coupling between the genset controller 230 and the ECU 220 and or the reefer controller 270 may be accomplished with data cables. In some embodiments, the communication between the genset controller 230 and the ECU 220 and/or the reefer controller 270 may be accomplished wirelessly.

Generally, by using the engine information from the ECU 220 such as engine operation condition values of the prime mover 210, and/or the refrigeration system information from the reefer controller 270 such as the transport refrigeration system operation condition values, the optimal operation speed of the prime mover 210 under the operation condition can be determined almost instantly. Therefore, the prime mover 210 can be controlled more effectively. This can help reduce unnecessary fuel consumption and increase the fuel efficiency of the prime mover 210, and also help reduce environment impact and extend the service lives of the prime mover 210 and the transport refrigeration system 260.

Aspects

It is noted that any of the aspects 1-8 below can be combined with any of aspects 9-11.

1. A method of operating a variable speed engine of a transport refrigeration system comprising:
   obtaining an operation condition value;
   obtaining a modeled optimal engine operation speed by fitting the operation condition value to a modeled engine response; and
   sending the modeled optimal engine operation speed to an engine control unit of the variable speed engine for instructing the variable speed engine to operate at the modeled optimal engine operation speed.

2. The method of aspect 1, further comprising obtaining the operation condition value from the electronic control unit of the variable speed engine.

3. The method of aspect 1, further comprising obtaining the operation condition value from a transport refrigeration system controller.

4. The method of aspect 2, further comprising the electronic control unit transmitting the operation condition value to a genset controller.

5. The method of aspect 3, further comprising the transport refrigeration system controller transmitting the operation condition value to a genset controller.

6. The method of aspects 1-5, wherein the modeled engine response includes an association between a plurality of modeled fuel efficient operation speeds and a plurality of operation condition values.

7. The method of aspect 2, wherein the operation condition value obtained from the electronic control unit is at least one of an amount of fuel delivered to the variable speed engine, an air intake flow, or a shaft speed of the variable speed engine.

8. The method of aspect 3, wherein the operation condition value obtained from the transport refrigeration system controller is at least one of an amp draw by a compressor, a temperature set point of the transport refrigeration system or a box temperature of the transport refrigeration system.

9. A transport refrigeration system comprising:
an engine with an electronic control unit, the electronic control unit configured to obtain an engine operation condition value;
a generator coupled to the engine;
a transport refrigeration system that is coupled to the generator, the generator configured to provide power to the transport refrigeration system;
a transport refrigeration system controller configured to obtain a transport refrigeration system operation condition value;
a controller; and
a memory unit configured to store a modeled engine response that includes an association between a plurality of modeled optimal fuel efficient engine operation speeds and a plurality of engine operation condition values and/or transport refrigeration system operation condition values;
wherein the controller is configured to receive at least one of the engine operation condition value or the transport refrigeration system operation value and is configured to determine an optimal fuel efficient engine operation value by fitting the at least one of the engine operation condition value or the transport refrigeration system operation condition value to the modeled engine response;
wherein the controller is configured to transmit the optimal fuel efficient engine operation value to the electronic control unit so as to instruct the electronic control unit to operate the engine at the optimal fuel efficient engine operation speed.

10. The refrigeration system of aspect 9, wherein the engine operation condition value of the engine is at least one of an amount of fuel delivered to the engine, an air intake flow, or a shaft speed of the engine.

11. The refrigeration system of aspect 9-10, wherein the transport refrigeration system operation condition value is an amp draw by a compressor of the transport refrigeration system, a temperature set point of the transport refrigeration system or a box temperature of the transport refrigeration system.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

What claimed is:

1. A method of operating a variable speed engine of a transport refrigeration system comprising:
at least one of an electronic control unit (ECU) within the variable speed engine and a transport refrigeration system (TRS) controller obtaining an operation condition value;
at least one of the ECU and the TRS controller transmitting the operation condition value to a genset controller, the genset controller being separate from the ECU and the TRS controller;
the genset controller obtaining a modeled optimal engine operation speed by fitting the operation condition value to a modeled engine response; and
the genset controller sending the modeled optimal engine operation speed to the ECU within the variable speed engine for instructing the variable speed engine to operate at the modeled optimal engine operation speed.

2. The method of claim 1, wherein the modeled engine response includes an association between a plurality of modeled fuel efficient operation speeds and a plurality of operation condition values.

3. The method of claim 1, wherein the operation condition value obtained from the ECU is at least one of an amount of fuel delivered to the variable speed engine, an air intake flow, or a shaft speed of the variable speed engine.

4. The method of claim 1, wherein the operation condition value obtained from the TRS controller is at least one of an amp draw by a compressor, a temperature set point of the transport refrigeration system or a box temperature of the transport refrigeration system.

5. The method of claim 1, wherein at least one of the ECU within the variable speed engine and the TRS controller obtaining the operation condition value includes obtaining the operation condition value in real-time.

6. A transport refrigeration system comprising:
an engine with an electronic control unit, the electronic control unit configured to obtain an engine operation condition value;
a generator coupled to the engine;
a transport refrigeration system that is coupled to the generator, the generator configured to provide power to the transport refrigeration system;
a transport refrigeration system controller configured to obtain a transport refrigeration system operation condition value;
a controller; and
a memory unit configured to store a modeled engine response that includes an association between a plurality of modeled optimal fuel efficient engine operation speeds and a plurality of engine operation condition values and/or transport refrigeration system operation condition values;
wherein the controller is configured to receive at least one of the engine operation condition value or the transport refrigeration system operation value and is configured to determine an optimal fuel efficient engine operation value by fitting the at least one of the engine operation condition value or the transport refrigeration system operation condition value to the modeled engine response;
wherein the controller is configured to transmit the optimal fuel efficient engine operation value to the electronic control unit so as to instruct the electronic control unit to operate the engine at the optimal fuel efficient engine operation speed.

7. The refrigeration system of claim 6, wherein the engine operation condition value of the engine is at least one of an amount of fuel delivered to the engine, an air intake flow, or a shaft speed of the engine.

8. The refrigeration system of claim 6, wherein the transport refrigeration system operation condition value is an amp draw by a compressor of the transport refrigeration system, a temperature set point of the transport refrigeration system or a box temperature of the transport refrigeration system.

9. The refrigeration system of claim 6, wherein the controller is a genset controller that is separate from the electronic control unit and the transport refrigeration system controller.

10. A method of operating a variable speed engine of a transport refrigeration system comprising:
- an electronic control unit (ECU) within the variable speed engine obtaining a real-time ECU operation condition value and a transport refrigeration system (TRS) controller obtaining a real-time operation TRS condition value;
- the ECU transmitting the real-time ECU operation condition value to a genset controller and the TRS controller transmitting the real-time TRS operation condition value to the genset controller, the genset controller being separate from the ECU and the TRS controller;
- the genset controller obtaining a modeled optimal engine operation speed by fitting the real-time ECU operation condition value and the real-time TRS operation condition value to a modeled engine response; and
- the genset controller sending the modeled optimal engine operation speed to the ECU within the variable speed engine for instructing the variable speed engine to operate at the modeled optimal engine operation speed,
- wherein the real-time operation condition value is at least one of an amount of fuel delivered to the variable speed engine, an air intake flow, an amp draw by a compressor of the transport refrigeration system, a set point of the transport refrigeration system and a box temperature in a space of a transport unit.

* * * * *